Feb. 20, 1968 C. W. LOFTIN 3,369,669
DOMESTIC BACK FLUSH WATER SYSTEM FILTER
Filed Feb. 9, 1966 4 Sheets-Sheet 2

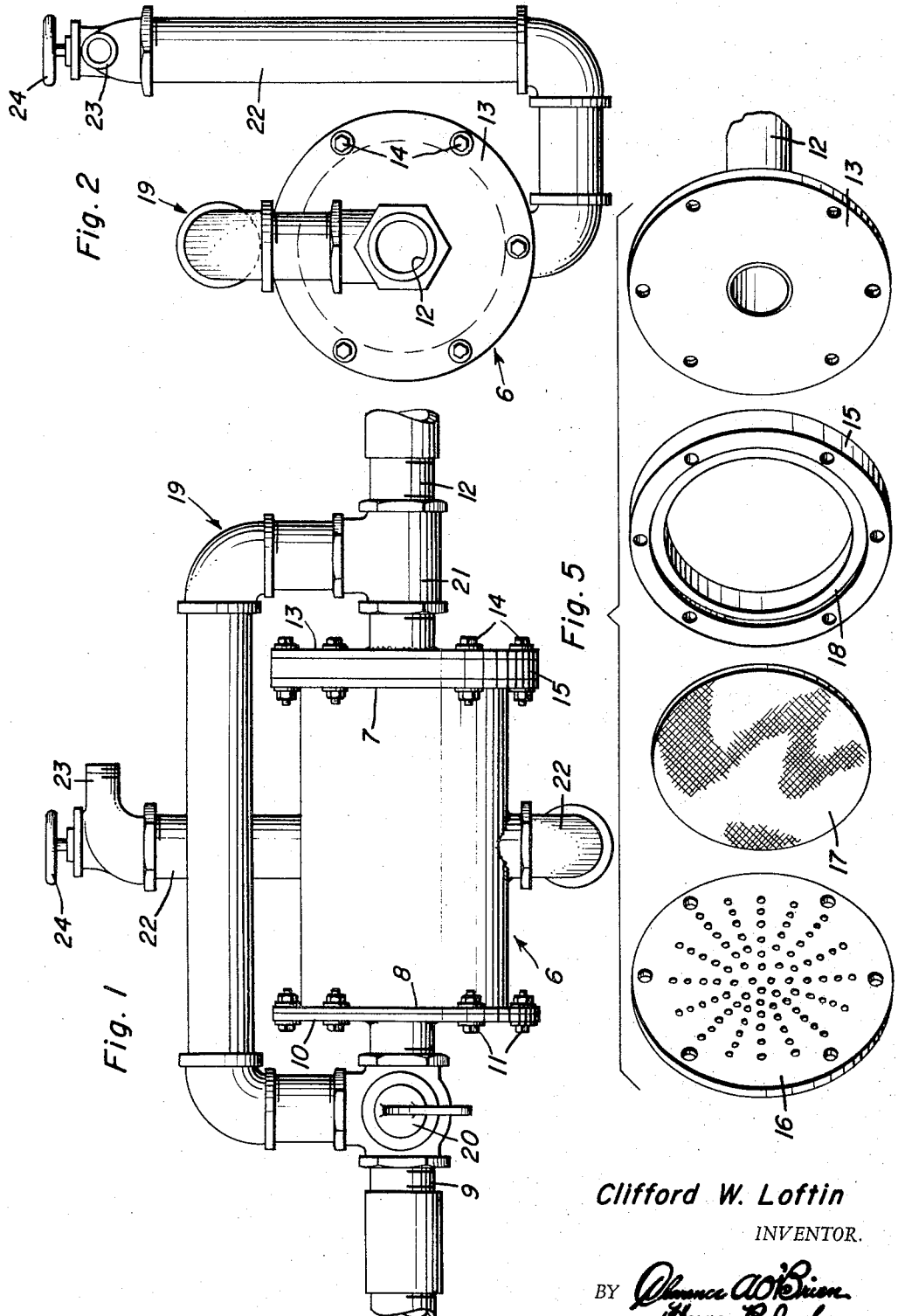

Clifford W. Loftin
INVENTOR.

Clifford W. Loftin
INVENTOR.

Feb. 20, 1968 C. W. LOFTIN 3,369,669
DOMESTIC BACK FLUSH WATER SYSTEM FILTER
Filed Feb. 9, 1966 4 Sheets-Sheet 4
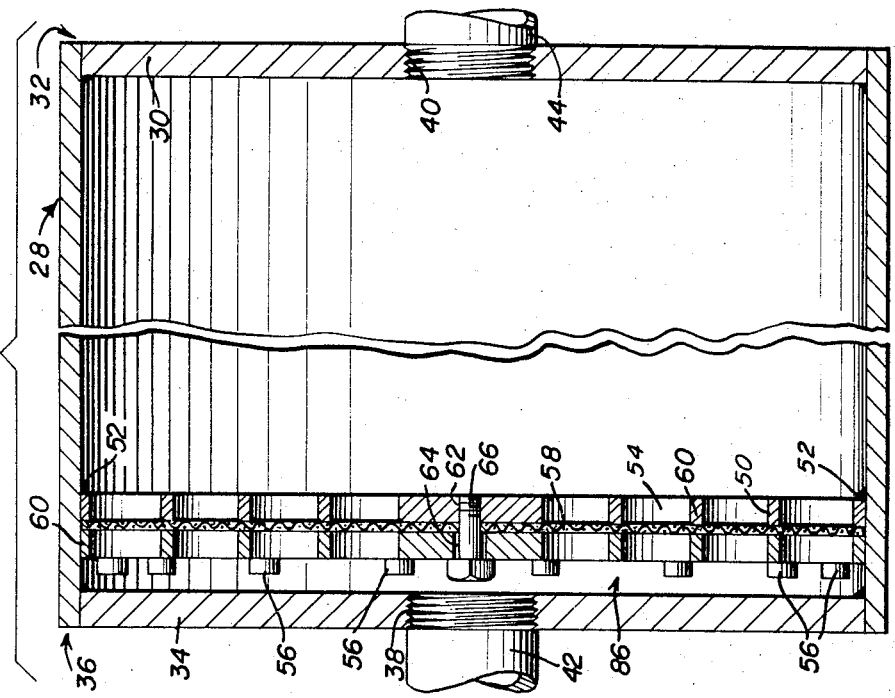
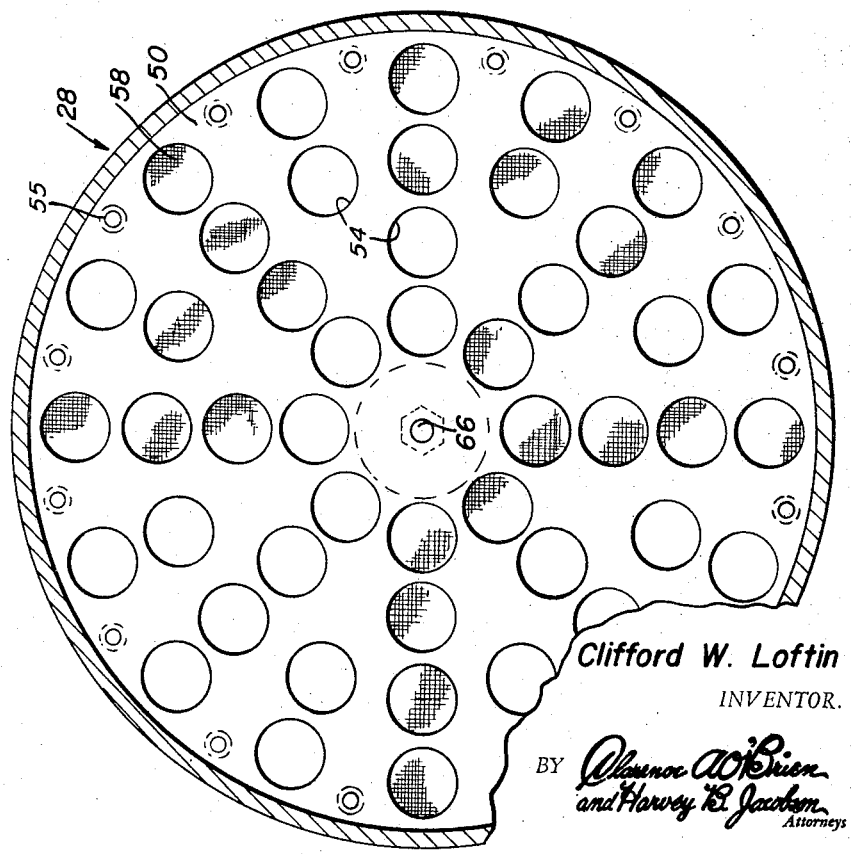
Clifford W. Loftin
INVENTOR.

United States Patent Office 3,369,669
Patented Feb. 20, 1968

3,369,669
DOMESTIC BACK FLUSH WATER SYSTEM FILTER
Clifford W. Loftin, 1466 Wells Ave.,
Claremont, Calif. 91711
Substituted for abandoned application Ser. No. 231,438,
Oct. 18, 1962. This application Feb. 9, 1966, Ser. No.
533,759
1 Claim. (Cl. 210—411)

ABSTRACT OF THE DISCLOSURE

A filter enclosure through which domestic water is adapted to pass and including a filter element and sediment chamber which may be back flushed when necessary, the filter enclosure including a hose bib which, whenever used, also is operative to flush the aforementioned sediment chamber and at least partially clean the filter element.

This invention relates generally to new and useful improvements in filters or strainers especially adapted for use in domestic water systems and more specifically to two embodiments of such filters.

It is an object of the instant invention to provide, in a manner as hereinafter set forth, two embodiments of filter devices which are adapted to be readily interposed in a fluid service line at a suitable point for removing foreign matter, particularly sand, from the fluid, or which may be interposed in any water or fluid line such as the line between a fire hydrant and a pumping truck to filter sand from the water prior to its reaching the truck pump.

It is another object of the present invention to provide a first embodiment of domestic water filter of the character described to which a lawn or garden hose may be conveniently connected when needed.

Still another object of the present invention is to provide a first embodiment of domestic water system filter of the aforementioned character which is automatically flushed and cleaned each time the garden hose is used.

A further object of the present invention is to provide, in a domestic water filter, including a cylindrical casing for the passage of the water and a removably mounted strainer therein, two embodiments of means for back-flushing the water through said strainer for cleaning the same.

Another object of the instant invention is to provide an improved filter of the character set forth comprising a unique construction and arrangement of parts whereby substantially the entire area of the strainer is utilized for maximum efficiency during the filtering of the water, the arrangement of parts also providing extremely rapid cleaning of the strainer removably mounted in the filter upon back flushing thereof.

Other objects are to provide two embodiments of domestic water system filters or strainers which are comparatively simple in construction, strong, durable, compact, of light weight, reliable and which may be manufactured, installed and maintained at extremely low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a first embodiment of a domestic water system back flush filter or strainer constructed in accordance with the present invention;

FIGURE 2 is a front end elevational view of the filter illustrated in FIGURE 1;

FIGURE 5 is an exploded perspective view of the components of the filter assembly illustrated in FIGURE 3;

FIGURE 7 is a view in vertical longitudinal section on an enlarged scale through the device illustrated in FIGURE 6; and FIGURE 8 is a view in transverse section through the device illustrated in FIGURE 6.

Figure 3:
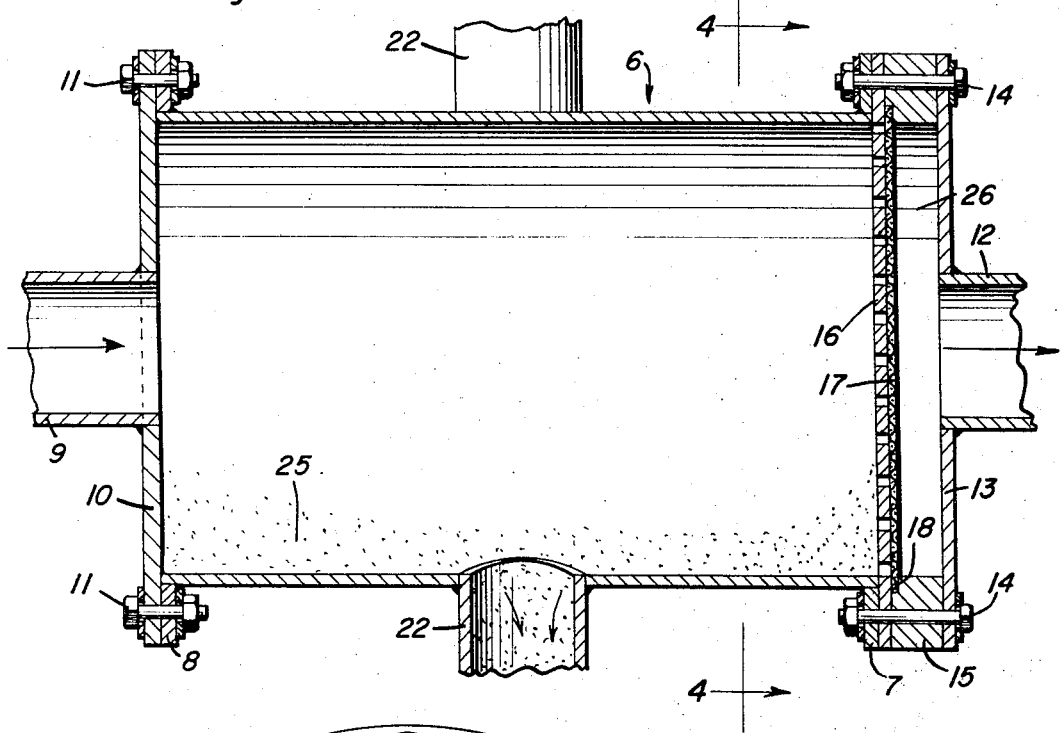
FIGURE 3 is a view in vertical longitudinal section through the device illustrated in FIGURES 1 and 2.
Figure 4:
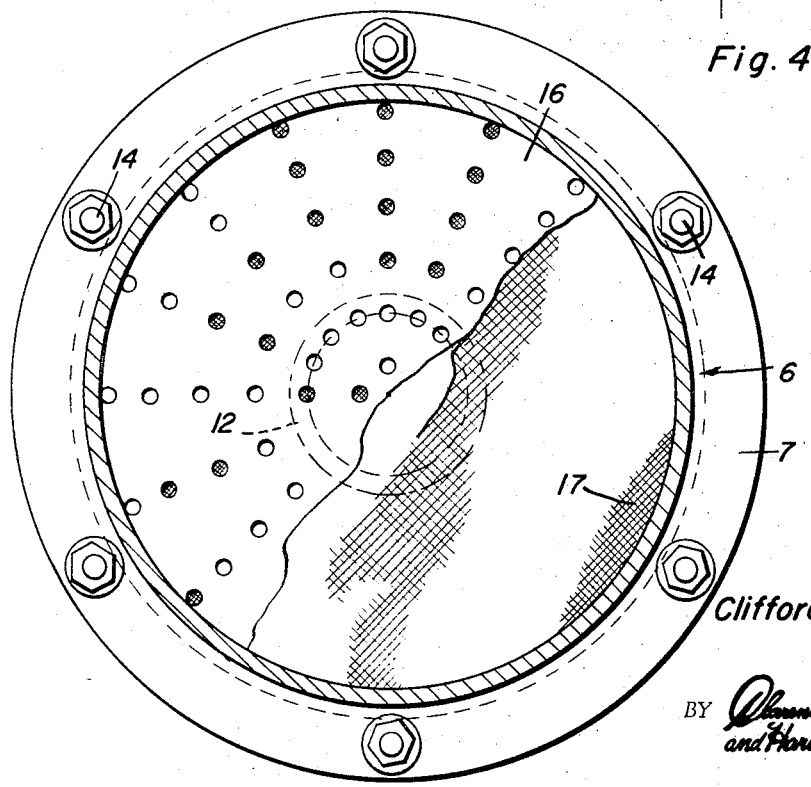
FIGURE 4 is a view in transverse section on an enlarged scale, taken substantially on the plane of the line 4—4 of FIGURE 3.

Referring now to the drawings in detail, and specifically to the embodiment of the invention illustrated in FIGURES 1–5, it will be seen that this embodiment of the invention comprises a horizontal cylindrical receptacle or casing of metal or other suitable material which is designated generally by reference numeral 6. The casing 6, which may also be of any desired dimensions, has welded on its front and rear end portions apertured flanges 7 and 8, respectively. An intake pipe 9 from a suitable source of water supply, has fixed on its discharge end portion an apertured flange 10. The flanges 8 and 10 are detachably secured together by bolt and nut assemblies 11.

Detachably connected to the forward end of the casing 6 is an outlet pipe 12. An apertured flange 13 is welded on the pipe 12. The flange 13 is detachably secured to the flange 7 of the casing 6 by bolt and nut assemblies 14 with an apertured spacer 15 therebetween. A foraminous strainer 16 of suitable metal or other material is interposed between the spacer 15 and the flange 7. In the embodiment shown in FIGURES 1–5, the strainer 16 is in the form of a perforated disk having openings therein which accommodate the bolts 14. On the front of the strainer 16 is a filter disk 17 of suitable material. The inner periphery of the spacing ring 15 is recessed, as at 18 to receive the peripheral portion of the filter disk 17. A bypass 19 around the casing 6 connects the pipes 9 and 12. One end of the bypass 19 is connected to the intake pipe 9 by a multiway valve 20 which is interposed in said pipe 9 adjacent the casing 6. The other end of the bypass 19 is connected to the pipe 12 by a T-coupling 21 interposed in said pipe 12. Connected to the lower portion of the casing 6 is one end of an upstanding discharge pipe 22. Mounted on the upper end of the pipe 22 is a horizontally projecting hose bib 23 of the reduction type. The hose bib 23 includes a suitable control valve 24.

It is thought that the operation of the device will be readily apparent from a consideration of the foregoing. Briefly, with the valve 24 closed and the valve 20 set to communicate the pipe 9 with the casing 6, water from the pipe 9 enters said casing and flows through the filter components 16 and 17 and enters the discharge pipe 12. Foreign matter is arrested by the strainer 16 and filter 17 and gravitates to the lower portion of the casing 6, as indicated at 25. The flange 13 and the spacer 15 provide a chamber 26 at the outlet end of the casing 6 which chamber permits substantially the entire area of the elements 16 and 17 to function. The construction and arrangement is such that the device will require little if any maintenance. However, if necessary, the filtering components may be easily removed for replacement, if necessary, by removing the bolts 14. By simply connecting a hose to the bib 23 and opening the valve 24 a lawn or garden may be conveniently watered. When this procedure is followed the casing is automatically flushed and cleaned, the water agitating and picking up the sand or other sediment 25 in the casing 6 and carrying it out the pipe 22. To backwash the strainer 16 the valve 24 is opened and the valve 20 is set to communicate the bypass 19 with the inlet pipe 9. Of course, it will be appreciated that a shutoff valve (not illustrated) is provided in the discharge pipe 12 at a point outboard of the T-coupling 21. Thus, the backwash operation is perfomed by the water which will flow through the valve 20 and through the bypass 19 through the T-coupling 21 and thus inwardly through the outlet pipe 12 which has been closed off at the outboard end thereof. The water will be under pressure and will enter the casing at the front end to flow in reverse through the filter elements 16 and 17 for cleaning the same and also flushing the casing 6 in an obvious manner.

Figure 6:
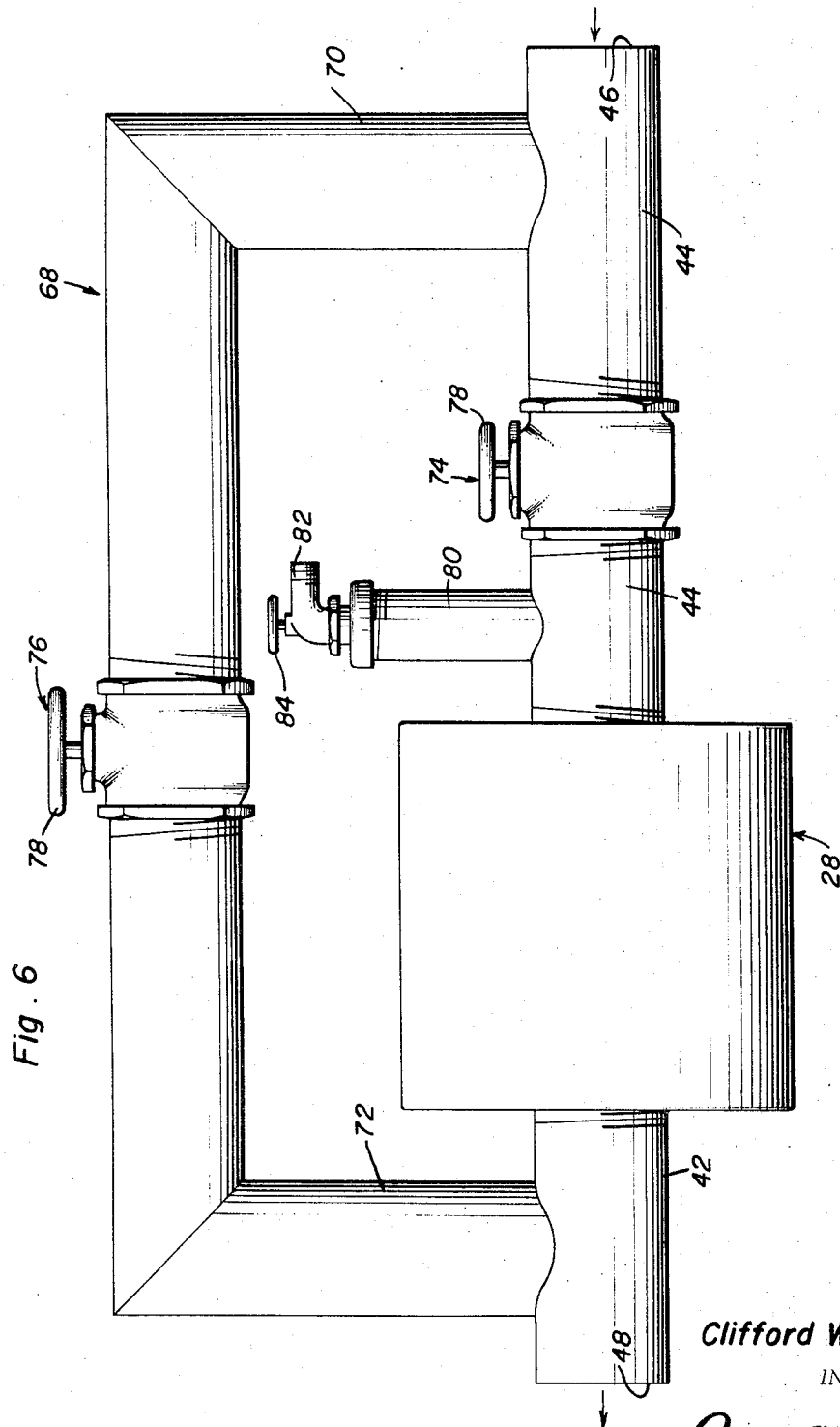
FIGURE 6 is a view in side elevation of a second embodiment of water system back flush filter or strainer constructed in accordance with the present invention.

Referring now to FIGURES 6–8 for a description of the second embodiment of the present invention, it will be seen that this embodiment of the invention comprises a horizontal cylindrical receptacle or casing of metal or other suitable material designated generally by reference numeral 28. The casing 28, which also may be of any desired dimensions, has a generally circular wall 30 welded in closing relationship on the rear end 32 thereof, and a generally circular wall 34 removably mounted in closing relationship at the front end 36 thereof, the wall 34 constituting a cover plate for the casing 28 removably mounted in the casing by any suitable mounting means (not shown).

The cover plate 34 and the wall 30 have centrally disposed threaded apertures 38 and 40 therein, respectively, in which are threadedly received an outlet pipe 42 and an intake pipe 44. Thus, by referring to FIGURE 6 in particular, it may be seen that the intake pipe 44 includes an intake end 46 and the outlet pipe 42 includes an outlet end 48. A first foraminous strainer 50 of suitable metal or other material is fixedly mounted in the casing 28 as for example by welds 52. In the embodiment shown in FIGURES 6–8, the strainer 50 is in the form of a perforated disk having openings 54 therein. Mounted on the back of the strainer 50 is a filter disk 58 of suitable material. The filter disk 58 is retained against the strainer 50 by a second foraminous strainer 60 which is identical in construction with the strainer 50, and includes smooth mounting holes (not shown) therein aligned with similar threaded holes 55 in which threaded bolts 56 are threadedly engaged after being passed through the holes in the strainer 50 in order to removably retain the strainer 60 against the fixed strainer 50, thus removably retaining the filter disk 58 in the casing 28. The strainers 50 and 60 include center mounting holes 62 and 64 therein through which is placed a mounting bolt 66 for further retaining the strainer 60 in place in the casing 28.

A bypass 68 around the casing 28 connects the pipes 42 and 44. One end of the bypass 68 is connected to the intake pipe 44 by the upstanding leg portion 70 of the bypass, and the other end of the bypass is connected to the outlet pipe 42 by the upstanding portion 72. A suitable gate valve generally denoted by reference numeral 74 is interposed in the intake pipe 44 between the upstanding leg 70 and the casing 28, and a similar suitable gate valve 76 is interposed in the bypass 68. The gate valves 74 and 76 each includes an operating handle 78 as is conventional in the art.

Connected to the intake pipe 44 and interposed between the gate valve 74 and the casing 28 is an upstanding discharge pipe 80. Mounted on the upper end of the pipe 80 is a horizontally projecting hose bib 82 of the reduction type, the hose bib 82 including a suitable control valve 84.

It is thought that the operation of the embodiment of the present invention will be readily apparent from a consideration of the foregoing, especially in view of the description of the embodiment illustrated in FIGURES 1–5 above. Briefly, with the valve 76 closed and the control valve 84 of hose bib 82 closed, water from the intake pipe 44 enters the casing 28 and flows through the filter components 50, 58 and 60 and enters the outlet pipe 42. Sand and other foreign matter are arrested by the strainers 50 and 60 and the filter disk 58. The cover plate 34 and the strainer 60 provide a chamber 86 at the forward end of the casing 28, which chamber permits substantially the entire area of the elements 50, 58 and 60 to function. Thus, it will be appreciated that, as in the first embodiment of the instant invention, the second embodiment will require little if any maintenance and that after a hose is connected to the hose bib 82 and the valve 76 is opened and the valve 74 is closed each time the hose is used the filter will be cleaned. However, if necessary, the filtering components may be easily removed for replacement, if necessary, by removing the cover plate 34 and the bolts 56.

Of course, it will also be appreciated that a shutoff valve is provided in the outlet pipe 42 at a point downstream of the upstanding leg 72 of bypass 68, which shutoff valve is provided in the outlet pipe 42 at a point downstream of the upstanding leg 72 of bypass 68, which shutoff valve would be normally closed during the backwash operation. Thus, it will be appreciated that the water entering the intake pipe 44 will not pass into the casing directly as the gate valve 74 is closed but will flow through the bypass 68 inasmuch as the gate valve 76 is opened, and as the aforementioned shutoff valve in the outlet pipe is closed, the water will thus enter the casing 28 through the outlet pipe 42 and thus flow in reverse through the filter elements 50, 58 and 60 for cleaning the same in an obvious manner. Of course, as will be appreciated, the chamber 86 allows the backwash flow to clean sediment from the face of the filter disk 58 in seconds inasmuch as the entire chamber 86 will be quickly filled with water entering through outlet pipe 42 during the backwash operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is as follows:

1. A filter for water systems comprising a cylindrical horizontally disposed casing including front and rear end walls, an inlet pipe opening through said rear wall, an outlet pipe opening through said front wall, transverse strainer means in the front end of said casing adjacent but spaced from said front wall for the passage of fluid therethrough, chamber means defined between said strainer means and said front wall, said strainer means comprising a first apertured disk fixedly mounted in said casing adjacent said front wall, a second apertured disk removably mounted on said first apertured disk intermediate said first apertured disk and said front wall, a filter disk between said first and second apertured disks, a bypass communicating said inlet pipe and said outlet pipe, a normally closed discharge pipe in said inlet pipe intermediate the rear end of said casing and said bypass, normally closed valve means for selectively opening said bypass, and normally open valve means in said inlet pipe intermediate said discharge pipe and said bypass for selectively closing said inlet pipe intermediate said discharge pipe and said bypass whereby fluid will normally flow directly through said casing from said inlet pipe to said outlet pipe, and when said bypass valve means is open, said discharge pipe is open and said inlet pipe valve means is closed, the fluid will flow reversely therethrough.

References Cited

UNITED STATES PATENTS

| 1,304,504 | 5/1919 | Monroe | 210—313 |
| 1,726,839 | 9/1929 | Kasztory | 210—411 X |
| 2,802,573 | 8/1957 | Weatherly | 210—489 X |
| 3,081,878 | 3/1963 | McCarty | 210—411 |

SAMIH N. ZAHARNA, *Primary Examiner.*

REUBEN FRIEDMAN, *Examiner.*

F. MEDLEY, *Assistant Examiner.*